Patented July 17, 1928.

1,677,348

UNITED STATES PATENT OFFICE.

JULIUS KANTOROWICZ, OF BRESLAU, GERMANY, ASSIGNOR TO WILLIAM H. FAIN, OF GREENWICH, CONNECTICUT.

PROCESS OF TREATING STARCH.

No Drawing. Application filed August 16, 1921, Serial No. 492,799, and in Germany May 31, 1918.
Renewed December 7, 1927.

This invention relates to the treatment of starches which swell in cold water. This kind of starch may be produced by drying starch paste in thin layers alone or mixed with chemicals of acid or basic reaction or of oxidizing properties on highly heated rollers or plates so that the drying is effected in a very short space of time.

Different starches behave differently towards water. Ordinary crude starch (potato flour) stirred with cold water yields a milky liquid from which the starch settles again after a few minutes, if the liquid is allowed to rest. Starch which swells in cold water, on the other hand, becomes pasty when stirred with cold water, With boiling water crude starch gives a thick paste, soluble starch a thin solution. Starch which swells in cold water can only be stirred with cold water without forming lumps when it is coarsely ground, whereas, when finely ground it yields lumps with cold water. Coarsely ground starch which swells in cold water has the disadvantage that although it can be stirred with water without lump formation, it forms a paste very gradually, at least 10 hours being necessary. Finely ground starch, which swells in cold water, rapidly gives a paste with cold water, but exhibits the objectionable formation of lumps. In the manufacture of coarsely ground starch that swells in cold water and does not form lumps, there is also produced besides the coarse material an unavoidably large percentage of fine starch which must be separated because otherwise lumps would be formed.

This invention purposes to avoid the formation of lumps by starch which swells in cold water when the starch is finely ground or contains finely ground particles and consists in mixing with such starches which swell in cold water, either when formed or before or during its formation, substances which retard the swelling up of the starch. Suitable substances are those which thicken ordinary starch paste or those which precipitate starch from aqueous solutions; the addition may be made to the crude starch or to the liquid in which the crude starch is suspended, or to finished starch; in any case the formation of lumps is avoided. To substances which thicken ordinary starch paste belong, in particular, aluminium compounds, such as alum, aluminium sulphate or alkali aluminates; feebly alkaline salts of sodium or potassium, such as borax or sodium phosphate; tannic acid and its salts; boric acid; salts of fatty acids and resin acids. To substances which precipitate starch belong many magnesium salts, particularly magnesium sulphate, sodium sulphate, strontium hydroxide.

The following examples illustrate the invention:

1. 100 kilos of potato flour are mixed with 100 litres of water in which 3 kilos of sodium phosphate have been dissolved. This mixture is made into a paste and dried simultaneously on hot surfaces in known manner. The starch capable of swelling in cold water thus obtained will so swell without forming lumps even in finely powdered form.

2. 30 kilos of magnesium sulfate are used and the process is otherwise conducted as described in Example 1.

3. 100 kilos of finished, finely ground starch capable of swelling in cold water, but forming lumps, made in any manner, is mixed with 2 kilos of finely ground borax. This mixture does not form lumps when it swells.

The present process does not claim the manufacture of starch swelling in cold water, the formation of which may be effected by any known or suitable process for this purpose and is the first condition of carrying out the object of the present process. If one wishes to use in the preparation of starch swelling in cold water, in the place of free alkalies, alkaline reacting substances they must have strong alkaline reaction which substances cannot be used for the present process. It is the same with acids.

I claim:—

1. The process of preventing the formation of lumps when starch which swells in cold water is added thereto, which consists in adding cold water to a mixture of a starch which swells in cold water and a substance which retards such swelling.

2. The process which consists in forming a mixture of a starch which swells in cold water with a substance which retards such swelling and adding cold water thereto without raising the temperature thereof, thereby obtaining a starch paste without the formation of lumps.

3. The process which consists in mixing starch which does not swell in cold water with water and a cold water starch swelling retarding substance, heating and drying the same quickly, thereby converting the starch to a form which does not form lumps when cold water is added thereto.

4. The process of preventing the formation of lumps when starch which swells in cold water is mixed therewith, which consists in adding to said starch a substance which retards the swelling thereof when water is added thereto and adding cold water to the mixture of said starch and said substance.

5. The process of preventing the formation of lumps when starch which swells in cold water is mixed therewith, which consists in adding to such starch which contains finely ground starch, a water soluble salt capable of retarding the swelling of such starch when water is added thereto and adding cold water to the mixture of said starch and said soluble salt.

6. The process of preventing the formation of lumps when starch which swells in cold water is mixed therewith, which consists in adding to said starch a water soluble aluminum salt to retard the swelling thereof when water is added to the mixture of starch and soluble aluminum salt, adding cold water to the said mixture and maintaining the mixture in a cold condition.

7. The process of preventing the formation of lumps when starch which swells in cold water is mixed therewith, which consists in adding aluminum sulphate to said starch in the dry condition, thereafter adding cold water thereto, and permitting said starch to swell without raising the temperature thereof.

8. The process which comprises the formation of a mixture of starch, an aluminum compound and water.

In testimony whereof I hereunto affix my signature.

JULIUS KANTOROWICZ.